Oct. 25, 1960 G. A. DMITROFF 2,957,335
BEARING AND LUBRICANT TESTER
Filed Sept. 4, 1956 3 Sheets-Sheet 1

INVENTOR
GEORGE A. DMITROFF
BY Jack N. McCarthy
AGENT

Oct. 25, 1960 G. A. DMITROFF 2,957,335
BEARING AND LUBRICANT TESTER
Filed Sept. 4, 1956 3 Sheets-Sheet 2

INVENTOR
GEORGE A. DMITROFF
BY Jack N. McCarthy
AGENT

Oct. 25, 1960  G. A. DMITROFF  2,957,335
BEARING AND LUBRICANT TESTER
Filed Sept. 4, 1956  3 Sheets-Sheet 3

INVENTOR
GEORGE A. DMITROFF
BY Jack N. McCarty
AGENT

United States Patent Office 2,957,335
Patented Oct. 25, 1960

2,957,335

BEARING AND LUBRICANT TESTER

George A. Dmitroff, Trumbull, Conn., assignor to United Aircraft Corporation, East Hartford, Conn., a corporation of Delaware Filed Sept. 4, 1956, Ser. No. 607,654

14 Claims. (Cl. 73—10)

This invention relates to a device for testing bearings or for testing a lubricant used for bearings.

The premature failure of oscillating bearings due to fretting corrosion has long been a problem. The term "fretting" is defined as a type of surface damage which occurs at the contact surfaces of materials subject to slight relative motion.

An object of this invention is to provide a testing device which will consistently and accurately give test results on bearing wear or properties of lubricants which will correlate with the results obtained in actual use.

Another object of this device is to provide a mechanism for placing a bearing in oscillatory motion and at the same time placing it under a bending moment and radial loads.

A further object of this invention is to provide a device in which the oscillatory movement of the bearing can be varied to simulate actual service conditions.

Another object of this device is to provide a mechanism in which the loads placed upon the bearing can also be instantaneously and infinitely varied within limits of the machine.

A further object of this invention is to provide a testing device in which the speed of the oscillation of the bearing can be varied infinitely within the limits of the machine.

Another object of this device is to provide a tester in which various types of bearings can be tested (i.e., tapered roller bearings, needle bearings).

A further object of this invention is to provide a device in which the testing time is measured and in which the drag developed in the test bearing, or the force required to oscillate the crank arm is measured.

Another object is to provide a bearing tester which will permit purging the lubricant from a bearing being tested.

Other objects and advantages will be apparent from the specification and from the accompanying drawings which illustrate the invention.

Figure 1:
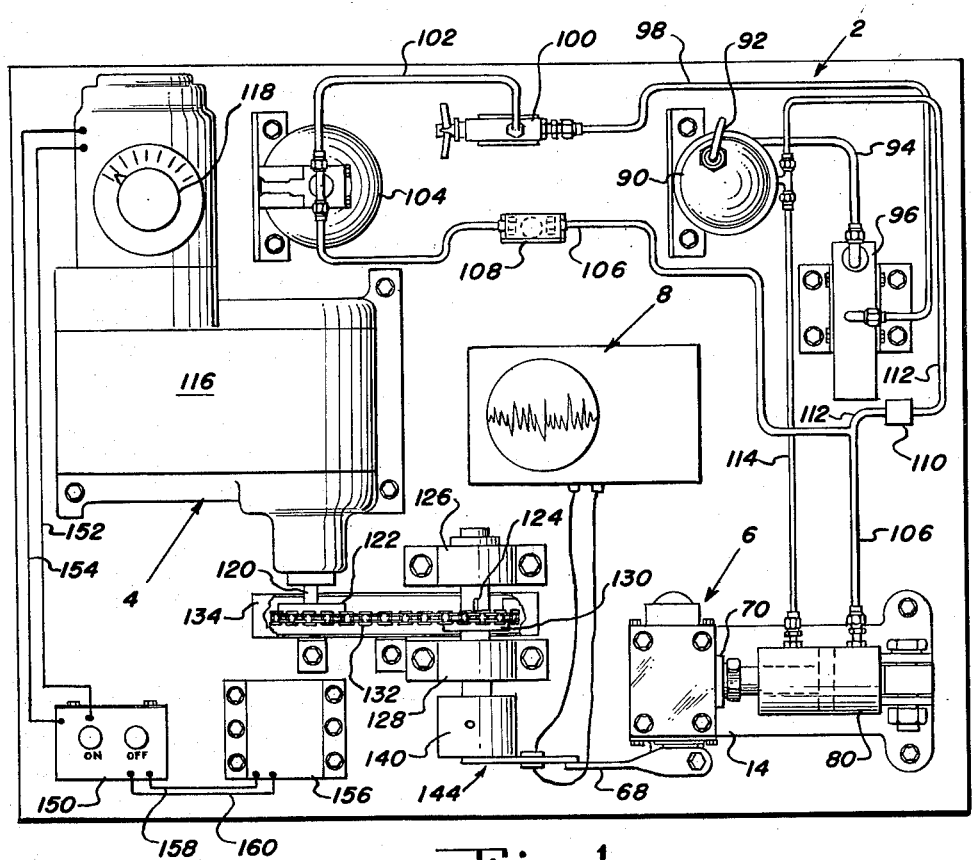
Fig. 1 is a plan view of the testing device.

With reference to Fig. 1, the tester shown therein comprises four main parts. These parts are (1) the hydraulic loading system 2, (2) the driving mechanism 4, (3) the test bearing assembly 6, and (4) the load measuring device 8.

Figure 2:
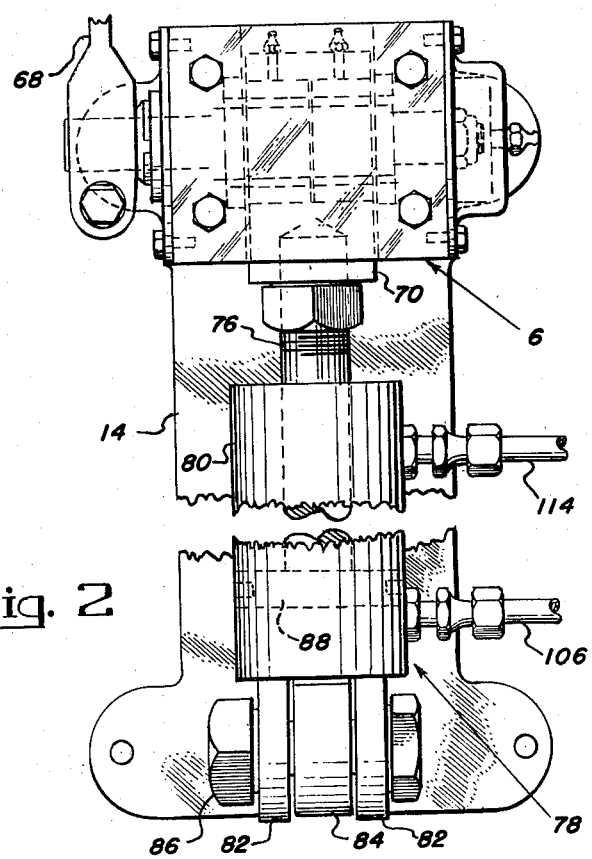
Fig. 2 is an enlarged view of the test bearing assembly and hydraulic loading cylinder and piston unit.
Figure 4:
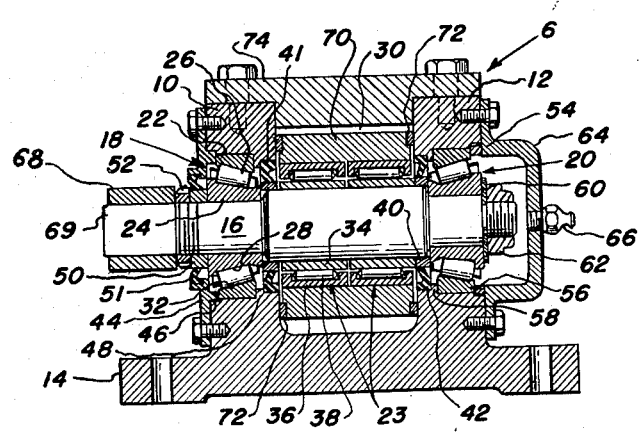
Fig. 4 is a view taken along the line 4—4 of Fig. 3 showing a tapered roller test bearing assembly.
Figure 3:
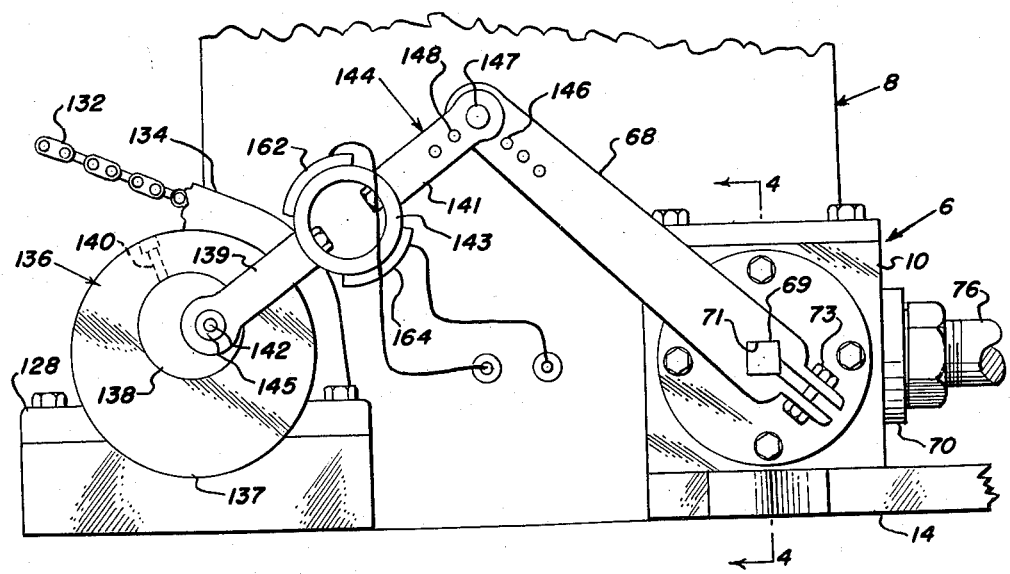
Fig. 3 is an enlarged view of the connection between the test bearing assembly and the driving mechanism showing a measuring device connected thereto.
Figure 6:
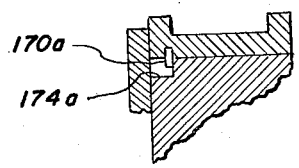
Fig. 6 is an enlarged view of a portion of Fig. 5 showing the snap ring.

The test bearing assembly 6, also shown in Figs. 2, 3 and 4, contains the bearings to be tested or the lubricant to be tested, whichever type test is being made. The test bearing assembly 6 is of a type having tapered roller bearings as the test bearings.

This test bearing assembly 6 comprises two upstanding members, or ears, 10 and 12 (see Fig. 4). These members, or ears, 10 and 12 project upwardly from a base 14. A shaft 16 extends through openings in each of said ears and is supported for rotation therein by test tapered roller bearing units 18 and 20. Each roller bearing unit consists of an outer ring 22 fixedly positioned within its respective projecting member or ear and an inner ring 24 positioned around said shaft with a plurality of coacting rollers 26 mounted therebetween. The race 28 of the inner ring is tapered and faces inwardly towards the space 30 between the members 10 and 12. The race 32 of the outer ring faces race 28 of its cooperating inner ring.

A portion of the shaft between said members, or ears, 10 and 12 across space 30 is of an enlarged diameter and has mounted therearound two caged needle bearing units 23. Each of these bearing units consists of an inner ring 34 mounted around the enlarged shaft portion along with an outer ring 36 spaced therefrom. A plurality of needle rollers 38 are mounted therebetween.

A sleeve 40 is positioned around shaft 16 between each inner ring 24 of the test roller bearing units 18 and 20 and the adjacent inner ring 34 of the caged needle bearing unit. Annular sealing members 41 and 42 are positioned one each between each of said sleeves and the opening in the ear in which it is positioned. Sealing member 41 is placed with the sealing element facing either toward the test bearing for packing or away from the test bearing for purging. The outer side of upstanding member, or ear, 10 has a plate 44 fixed thereto which has an inwardly projecting ring 46 which forms along with shoulder 48 in the opening in ear 10 the means for fixedly positioning the adjacent outer ring 22. A spacer member 50 is positioned around shaft 16 as it projects outwardly from upstanding member, or ear, 10 and is held thereon by a nut 52. An annular sealing member 51 is positioned between spacer member 50 and the inner periphery of plate 44 with the sealing element facing the bearing for packing.

The outer side of upstanding member, or ear, 12 has a plate 54 fixed thereto which has an inwardly projecting ring 56 which forms along with shoulder 58 in the opening in ear 12 the means for fixedly positioning the adjacent outer ring 22. A washer member 60 is positioned around the shaft 16 as it projects outwardly from the upstanding member, or ear, 12 and is held thereon by a nut 62. Plate 54 has a portion 64 thereof which forms a housing for the adjacent end of shaft 16. A grease fitting 66 is provided thereon for purging the bearing 20.

The end of shaft 16 projecting from upstanding member, or ear, 10 has an arm 68 connected thereto through which shaft 16 is moved by the driving mechanism 4. Shaft 16 is machined to a rectangular section at its end at 69 and the attached end of arm 68 is formed as a bifurcated section with a mating recess 71 to receive end 69. A bolt 73 extends between the tines of the bifurcated section to hold the arm in place. It is noted that to vary the thrust preloading of the roller test bearings, the self-locking nut 62 can be variably positioned. This action forces the races 28 of the inner rings 24 inwardly toward the races 32 of the outer rings 22 thereby applying a force on the rollers 26.

Around the outer rings 36 of the two cages needle bearing units 23 and located within space 30 is a load yoke 70. This yoke is centered within the space 30 by spacing members 72 which also act as thrust bearings. Members 72 have radial openings therein to permit purging of the bearings. To prevent inward deflection of the upstanding members, or ears, 10 and 12, due to preload of the test bearings, a thrust plate 74 is positioned with a portion thereof between said ears. To radially load the test bearings the load yoke is moved in a radial direction by the hydraulic loading system 2.

The load yoke 70 extends from between the ears 10 and 12 (see Fig. 2) and is connected to the free end of the piston rod 76 of the actuating cylinder and piston unit 78 of the hydraulic loading system. This unit 78 comprises a cylinder 80 having two bracket members 82 extending from one end thereof. Each member 82 has a circular hole therein, said holes being coaxially aligned. Members 82 are positioned around an upstanding bracket member 84. A bolt 86 extends through an opening in the upstanding bracket 84 and the holes in the brackets 82 to mount cylinder 80 to the base 14. The end of piston rod 76 within said cylinder is attached to a piston 88. As force is applied to the under side of piston 88 as viewed in Fig. 2, this force is directed through piston rod 76 to the load yoke 70 which in turn distributes the load through the shaft 16 to the test bearings.

The hydraulic loading system 2 includes a fluid reservoir 90 which is vented to atmosphere at 92. Fluid is pumped from reservoir 90 through a conduit 94 by a pump 96. Pump 96 may be a hand pump or any other pump controllable by manual means. From pump 96 the fluid is transmitted by conduit 98 to a shutoff valve 100. From valve 100 the fluid is directed through a conduit 102 to an accumulator 104. From the accumulator the fluid is directed through a conduit 106 to the right end of cylinder 80. A pressure gauge 108 is located in conduit 106 to determine the actuating pressure being admitted to the actuating cylinder 80. A needle valve 110 is located in a conduit 112 which is connected back to the reservoir 90 to permit the pressure in conduit 106 to be bled therefrom. A conduit 114 connects the left end of cylinder 80 to the reservoir 90 to provide for the return of any fluid which may possibly leak by the piston 88. To provide the desired pressure at the right end of cylinder 80 to act upon the face of the piston 88, the valve 110 is closed and the valve 100 is opened. Pump 96 is then operated to bring the pressure in line 106 to the desired amount as indicated on the pressure gauge 108, then valve 100 is closed. While some tests call for a constant pressure throughout, others require pressure changes. If a higher pressure is required during a test, the valve 100 can be opened and the pump 96 operated to increase the pressure. When the pressure is reached as indicated by the pressure gauge 108, the valve 100 can be closed. If a lower operating pressure is needed, valve 110 can be opened to bleed line 106 until the pressure gauge 108 reads the desired value.

The driving mechanism 4 comprises a conventional variable speed motor 116, such speed being controlled by knob 118. The output shaft 120 of the motor 116 has a sprocket member 122 fixed thereto. Located adjacent to said motor is a jack shaft 124 mounted for rotation between two shaft supporting brackets 126 and 128. Jack shaft 124 is mounted parallel to output shaft 120 and has a sprocket member 130 fixed thereto lying in a plane with the sprocket member 122 on output shaft 120. A sprocket chain 132 is placed around both of said sprockets and drivingly connects output shaft 120 to jack shaft 124. A cover 134 is mounted around said sprocket chain as a safety measure.

On a free end of the jack shaft 124 an adjustable throw crank 136 is located. Crank 136 comprises a circular member 138 rotatably mounted in an eccentric position in the open face of circular hub 137. Member 138 extends over the projected centerline of jack shaft 124 to a point outwardly from said centerline.

Means are provided to fix the movable eccentrically positioned member 138 in any desired position such as by a set screw 140. A stub shaft 142 extends outwardly from the face of member 138 adjacent its outer periphery. This crank permits a varying eccentric distance of shaft 142 in relation to the projected centerline of jack shaft 124 from a minimum, as it approaches zero overlying the projected centerline of jack shaft 124, to a maximum when it is positioned the greatest distance from the projected centerline of jack shaft 124.

A composite arm 144 has one free end connected to stub shaft 142 by a ball bearing unit 145 positioned within the end of said arm and the other end connected to the free end of arm 68 by a connecting pin 147. Composite arm 144 comprises two short arm sections 139 and 141 with a load ring 143 connected therebetween. While this load ring may be connected between arm sections in any desired manner, it is shown as being bolted into position. The load ring is for a purpose to be hereinafter described. While the arms are shown (see Fig. 1) one alongside the other, it is to be understood that any satisfactory operating position of the arms can be used along with any satisfactory operating connection between them. Holes 146 in arm 68 and holes 148 in arm 144 can be used to vary the operating lengths of arms 68 or 144 to control the position of the test bearing in the assembly or control the angle through which the bearing oscillates. It can be seen that as jack shaft 124 rotates crank 136, arm 144 imparts a rocking motion to arm 68 which in turn oscillates shaft 16 and the test bearing.

The driving mechanism 4 includes a starter switch 150. When it is desired to start the device, the "on" button is actuated and when it is desired to stop the device, the "off" button is actuated. The starter 150 is connected to the motor 116 by electrical connectors 152 and 154. A time recording device 156 is connected to the starter 150 by electrical connectors 158 and 160. When the "on" button is actuated, the time recording device is also put into operation and when the testing is completed and the "off" button is actuated the time meter will record the actual testing time. A source of power not shown is supplied to the driving mechanism 4.

The drag developed in the test bearings is determined here by measuring the force required to oscillate the arm 68. This is done by measuring the strain placed on the load ring 143 in the composite arm 144. To measure this force strain gauges 162 and 164 are placed on the load ring.

The load ring can be calibrated in desired units. The output from the strain gauges can then be fed into a load measuring device 8 and a reading obtained which would indicate the measure of the drag load in the bearings. The measuring device 8 could consist of known testing equipment such as the combination of a bridge circuit and output amplifier to an oscilloscope. Other devices can be used to determine the force required to oscillate arm 68.

Figure 5:
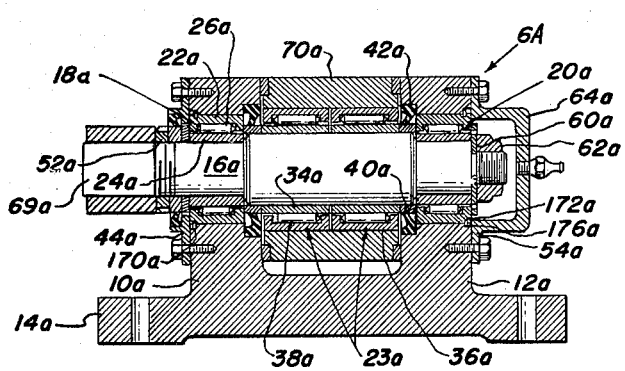
Fig. 5 is a view similar to Fig. 4 showning a needle test bearing assembly.

The test bearing assembly 6A (see Fig. 5) is similar to the test bearing assembly 6 (see Fig. 4), there being only a few differences. Test bearing assembly 6A is of a type having needle bearings as the test bearings. The shaft 16a which extends through the openings in each of the ears 10a and 12a is supported for rotation therein by test needle bearing units 18a and 20a. Each needle bearing unit consists of an outer ring 22a fixedly positioned within its respective projecting member or ear, and an inner ring 24a positioned around said shaft with a plurality of coacting needle rollers 26a mounted therebetween.

Shaft 16a is identical to shaft 16 and is mounted within yoke 70a in the same manner as test bearing assembly 6. The enlarged diameter of shaft 16a has mounted therearound two caged needle bearing units 23a. Each of these bearing units consists of an inner ring 34a along with an outer ring 36a spaced therefrom. A plurality of needle rollers 38a are mounted therebetween.

A sleeve 40a is positioned around shaft 16a between each outer ring 22a of the test needle bearing units 18a and 20a and the adjacent inner ring 34a of a caged needle bearing unit 23a. An annular sealing member 42a is positioned between each of said sleeves and the opening in the ear in which it is positioned. The outer side of upstanding member, or ear, 10a has a plate 44a fixed thereto which forms along with a snap ring 170a, which is positioned in the outer face of outer ring 22a and extends into a recess 174a in the opening in ear 10a, the means for fixedly positioning the adjacent outer ring 22a. Two spacer members are positioned around shaft 16a as it projects outwardly from upstanding member 10a and held thereon by a nut 52a. An annular sealing member is positioned between the spacer member adjacent nut 52a and the inner periphery of plate 44a. Since these bearings cannot be preloaded in an axial direction, it is not necessary to provide a thrust plate 74 such as shown in the bearing assembly 6.

The outer side of upstanding member, or ear, 12a has a plate 54a which forms along with a snap ring 172a, which is positioned in the outer face of outer ring 22a and extends into a recess 176a, in opening in ear 12a, the means for fixedly positioning adjacent outer ring 22a. A perforated washer member 60a is positioned around the shaft 16a as it projects outwardly from the upstanding member 12a and is held thereon by a nut 62a which also locks inner ring 24a to shaft 16a to prevent rotation. The washer serves two purposes. One is to provide a bearing surface for thrust (if any) against outer ring 22a. The other is to provide a passage for lubricant through the perforations. Plate 54a has a portion 64a thereof which forms a housing for the adjacent end of shaft 16a.

As a result of this invention a machine is provided which can be used either to test the performance and durability of bearings relative to each other or the lubricating qualities of lubricants relative to each other. In order to test bearings a series of roller or needle bearings, depending on which type is to be tested, would be inserted in the test machine. Each bearing would be lubricated with exactly the same type of lubricant and would be run until such time as the bearing failed or until the amount of force indicated by the strain gauge to move the bearing was excessive. In this manner, the bearings which stand up the longest on the test machine would be indicated to have the longest life in actual use.

In order to test lubricants, similar bearings would be used for each test and different lubricants would be admitted into the test bearing area. In this way the test would be run until such time as the bearing failed or an excessive force to move the bearing is indicated and by comparing the results of the different lubricants used on identical bearings the most satisfactory lubricant can be chosen.

When making a series of tests such as described, the hydraulic force in the cylinder 80 would be held constant and either the bearings or the lubricants, but not both, would be changed for each test. In this manner, by measuring the time required for the bearing to fail or become damaged, an accurate record can be made of the relative performance of the various different types of lubricants and bearings which are available.

I claim:

1. In a testing device in combination, means mounting a test bearing, said means including a frame, said bearing having an outer ring and an inner ring, said outer ring being fixedly held in said frame, a shaft mounted in said inner ring, means for radially loading said shaft at a point spaced axially from said bearing, said means for radially loading said shaft including bearing means around said shaft and means for applying a force on said bearing means to be transmitted therethrough to said shaft, and means for oscillating one of said rings in relation to the other.

2. In a testing device in combination, means mounting two test bearings, said means including a frame having two members spaced apart, each bearing having an outer ring and an inner ring, a shaft extending through both inner rings, means for radially loading said shaft between said two bearings, said means for radially loading said shaft including bearing means around said shaft and means for applying a force on said bearing means to be transmitted therethrough to said shaft, and means for oscillating said shaft.

3. In a testing device in combination, means mounting two test bearings, said means including a frame having two members spaced apart, each bearing having an outer ring and an inner ring, a shaft extending through both inner rings, bearing means located around said shaft between said two members of said frame, said bearing means having an outer ring and an inner ring, said shaft projecting through said last named inner ring, means connected to said outer ring of said bearing means for radially loading said shaft, and means for oscillating said shaft.

4. In a testing device in combination, means mounting two test bearings, said means including a frame having two members spaced apart, each bearing having an outer ring and an inner ring, a shaft extending through both inner rings, means for radially loading said shaft, means for oscillating said shaft, said last named means including a radially extending arm fixed to said shaft and a second arm connected to said first arm at a point displaced from the centerline of said shaft, said oscillating means also including means for moving said first arm through an angle of oscillation by said second arm, and means for measuring the force exerted by said second arm to oscillate said first arm.

5. In a testing device in combination, means mounting two test bearings, said means including a frame having two members spaced apart, each bearing having an outer ring and an inner ring, a shaft extending through both inner rings, bearing means located on said shaft between the two bearings, means for radially loading said bearing means, said loading placing a bending moment on said shaft and a load on the two bearings, a radially extending arm fixed to said shaft, a driving shaft, and means connecting said driving shaft to said arm for oscillating said first named shaft.

6. In combination, a test bearing assembly, said assembly having means mounting two test bearings spaced apart, each of said test bearings having an outer ring fixed in said means, each of said test bearings having an inner ring, a shaft mounted in said inner rings, means positioned around said shaft between said bearings, means for applying a force on said last named means, said force being transmitted to said bearings through said shaft, means connected to said shaft for oscillating said shaft while said applying means is applying a force on said bearings, and means for measuring the force required to oscillate said shaft.

7. In combination, a test bearing assembly, said assembly having means mounting two test bearings spaced apart, each of said test bearings having an outer ring fixed in said means, each of said test bearings having an inner ring, said inner rings being coaxially aligned, a shaft mounted in said inner rings against axial movement, yoke means positioned around said shaft between said bearings, means for applying a force on said yoke, said force being transmitted to said bearings through said shaft, means connected to said shaft for oscillating said shaft while said applying means is applying a force on said yoke, and means for measuring the force required to oscillate said shaft.

8. In combination, a test bearing assembly, said assembly having means mounting two test bearings spaced apart, each of said test bearings having an outer ring fixed in said means, each of said test bearings having an inner ring, said inner rings being coaxially aligned, a shaft mounted in said inner rings against axial movement, yoke means positioned around said shaft between said bearings, a cylinder, a position mounted in said cylinder, said piston having a piston rod extending from one end of said cylinder, the other end of said cylinder being pivotally mounted, the free end of said piston rod being connected to said yoke means, means for applying a force on said piston, said force being transmitted to said bearings through said shaft and yoke means, means connected to said shaft for oscillating said shaft while said piston is applying a force on said yoke means, and means for measuring the force required to oscillate said shaft.

9. In combination, a test bearing assembly, said assembly having means mounting two test bearings spaced apart, each of said test bearings having an outer ring fixed in said means, each of said test bearings having an inner ring, said inner ring being coaxially aligned, a shaft mounted in said inner rings against axial movement, yoke means positioned around said shaft between said bearings, means for applying a force on said yoke, said force being transmitted to said bearings through said shaft, means connected to said shaft for oscillating said shaft while said applying means is applying a force on said yoke, said last named means having means for varying the angle of oscillation of said shaft, and means for measuring the force required to oscillate said shaft.

10. In combination, a test bearing assembly, said assembly having means mounting two test bearings spaced apart each of said test bearings having an outer ring fixed in said means, each of said test bearings having an inner inner ring, said inner rings being coaxially aligned, a shaft mounted in said inner rings against axial movement, yoke means positioned around said shaft between said bearings, a cylinder, a piston mounted in said cylinder, said piston having a piston rod extending from one end of said cylinder, the other end of said cylinder being pivotally mounted, the free end of said piston rod being connected to said yoke means, means for applying a force on said piston, said force being transmitted to said bearings through said shaft and yoke means, means for purging one of said bearings, means connected to said shaft for oscillating said shaft while said piston is applying a force on said yoke means, and means for measuring the force required to oscillate said shaft.

11. In combination, a test bearing assembly, said assembly having means mounting two test bearings spaced apart, each of said test bearings having an outer ring fixed in said means, each of said test bearings having an inner ring, a shaft mounted in said inner rings, bearing means positioned around said shaft between said bearings, said bearings having an inner ring mounted on said shaft, said bearing means having an outer ring, means for applying a force on said outer ring of said last named means, said force being transmitted to said bearings through said shaft, means connected to said shaft for oscillating said shaft while said applying means is applying a force on said bearings.

12. In combination, means mounting two test bearings, said means including a frame having two members spaced apart, each test bearing having an outer ring and an inner ring, each outer ring being fixedly held in its member, a shaft extending through both inner rings, means for radially loading said shaft, and means for oscillating said shaft, said oscillating means including an arm connected to said shaft, said arm including means for measuring the force required to oscillate said shaft.

13. In combination, means mounting two test bearings, said means including a frame having two members spaced apart, each bearing having an outer ring and an inner ring, a shaft extending through both inner rings, bearing means located around said shaft between said two members of said frame, said bearing means having an outer ring and an inner ring, said shaft projecting through said last named inner ring, means connected to said outer ring of said bearing means for radially loading said shaft, means for oscillating said shaft, and means mounted independently of said bearing means for measuring the force required to oscillate said shaft.

14. In a testing device in combination, means mounting two test bearings spaced apart, each bearing having an outer ring and an inner ring, a shaft extending through both inner rings, means for radially loading said shaft between the bearings, means for oscillating one of said rings with respect to the other, said last named means including an actuating device connected to said one of said rings, and means for measuring the force exerted by said actuating device for oscillating said one of said rings.

References Cited in the file of this patent

UNITED STATES PATENTS

| | | |
|---|---|---|
| 1,990,771 | Boden | Feb. 12, 1935 |
| 2,067,996 | Werder | Jan. 19, 1937 |
| 2,337,414 | Rieber | Dec. 21, 1943 |
| 2,591,722 | Rounds et al. | Apr. 8, 1952 |
| 2,623,384 | Pigott | Dec. 30, 1952 |
| 2,718,779 | McLean | Sept. 27, 1955 |

UNITED STATES PATENT OFFICE

CERTIFICATE OF CORRECTION

Patent No. 2,957,335            October 25, 1960

George A. Dmitroff

It is hereby certified that error appears in the printed specification of the above numbered patent requiring correction and that the said Letters Patent should read as corrected below.

Column 7, line 4, for "position" read -- piston --; line 32, strike out "inner"; column 8, line 3, for "bearings" read -- bearing means --.

Signed and sealed this 11th day of April 1961.

(SEAL)
Attest:

ERNEST W. SWIDER
Attesting Officer

ARTHUR W. CROCKER
Acting Commissioner of Patents